(12) United States Patent
Doucette et al.

(10) Patent No.: US 9,672,588 B1
(45) Date of Patent: Jun. 6, 2017

(54) APPROACHES FOR CUSTOMIZING MAP VIEWS

(71) Applicant: Amazon Technologies, Inc., Reno, NV (US)

(72) Inventors: Jason Allen Doucette, Seattle, WA (US); David Adam Edelstein, Seattle, WA (US); Clayton Matthew Magouyrk, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 362 days.

(21) Appl. No.: 14/303,731

(22) Filed: Jun. 13, 2014

(51) Int. Cl.
*G06T 3/40* (2006.01)
*G06F 3/041* (2006.01)
*G06F 3/01* (2006.01)

(52) U.S. Cl.
CPC ............... *G06T 3/40* (2013.01); *G06F 3/011* (2013.01); *G06F 3/041* (2013.01)

(58) Field of Classification Search
None
See application file for complete search history.

(56) References Cited

U.S. PATENT DOCUMENTS

| 2007/0233379 | A1* | 10/2007 | Bowman | G01C 21/367 701/431 |
| 2012/0023446 | A1* | 1/2012 | Minde | G09B 29/007 715/810 |
| 2013/0016129 | A1* | 1/2013 | Gossweiler, III | G06F 3/012 345/667 |

* cited by examiner

*Primary Examiner* — Michelle Chin
(74) *Attorney, Agent, or Firm* — Polsinelli LLP

(57) ABSTRACT

A computing device can present a map of a geographic region. The computing device can determine that a user operating the computing device has performed a particular action. The particular action can be, for example, a particular gesture. The computing device can determine that a distance between the user's face and the display screen of the computing device is within a threshold distance. If the user's face is within a threshold distance of the display screen, the map can be displayed in a dynamic view mode. While in the dynamic view mode, the map for the geographic region includes at least one additional map label for a feature that is located in the geographic region and navigation of the rendered map is disabled.

20 Claims, 14 Drawing Sheets

APPROACHES FOR CUSTOMIZING MAP VIEWS

BACKGROUND

Interactive geographic maps, e.g., frames of maps provided by a web map service, can provide a visual representation of a geographic region. An interactive geographic map for a particular geographic region can also describe various features that appear in the particular geographic region. For example, an interactive geographic map can describe line features, e.g., roads and rivers, area features, e.g., countries, parcels, forests, and lakes, and point features, e.g., villages and cities. Each feature in an interactive geographic map can be labeled, e.g., annotated, by positioning, near the feature and in the interactive geographic map, one or more map labels that describe the feature. For example, an interactive geographic map that includes a point feature referencing the city of San Francisco can be labeled by placing a map label "San Francisco" near the point feature.

Computerized methods can be used to automatically position respective map labels near features in an interactive geographic map. Such computerized methods can be configured to label features in an interactive geographic map based on predefined rules, e.g., repeat labels for roads or place map labels for point features in a position that is located northwest direction of the point features. Once labeled, the interactive geographic map can be presented to a user, for example, through a display screen of a computing device. Thus, in general, the interactive geographic map is entirely computer generated and will largely look the same to all users. However, in some instances, users may want to get a better view of a certain region, for example, points of interest in a certain region of the interactive geographic map. To do so, a user can typically adjust the map by manually navigating to a desired region of the map and increasing the zoom level.

BRIEF DESCRIPTION OF THE DRAWINGS

Various embodiments in accordance with the present disclosure will be described with reference to the drawings, in which.

DETAILED DESCRIPTION

Figure 1A:
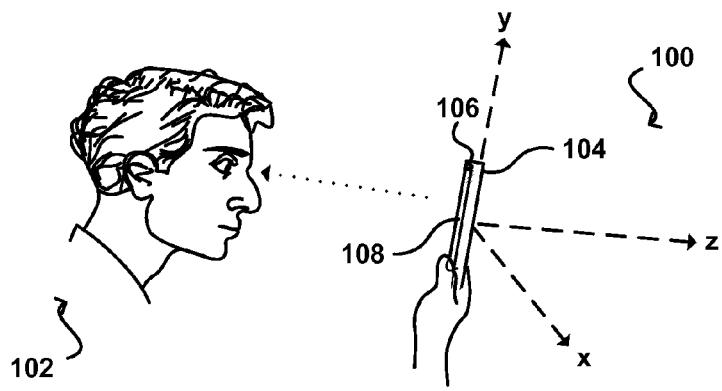
FIG. 1A illustrates a user operating a computing device in a normal view mode.

Systems and methods in accordance with various embodiments of the present disclosure overcome one or more of the above-referenced and other deficiencies in conventional approaches to customizing views of digital maps. In particular, various embodiments of the present disclosure can provide a method of customizing the display of a digital map through a dynamic view mode that enhances certain details in a region in the map when the user is attempting to inspect finer details in the map. For example, as displayed in a normal view mode, in which normal view mode details are shown. Typically, this involves using generally known computerized methods to automatically position map labels near features in the map and in which a user can navigate the map, e.g., through gestures or increasing the zoom level. In contrast, the dynamic view mode provides an approach to provide the user with different or other types of additional dynamic view mode details about the map being presented without such navigation. For example, in the dynamic view mode, zoom capability for the map may be disabled and certain features in the map may be labeled while others are not, or certain features in the map may be labeled differently (e.g., using a different font or size) than others.

For example, in some embodiments, an application displaying the map in dynamic view mode is configured to not allow the ability to zoom in further to load additional, more detailed, tiles, or show three-dimensional (3D) buildings, or continue a zoom motion. In dynamic view mode, the map shown is still generally the same as it would be in normal view mode. However, in dynamic view mode, a different view of the map is shown. For example, in the dynamic view, additional dynamic view mode details provided can include selectively labeling certain features or labeling certain features in the map differently (e.g., using a different font or size) than others. For example, in some embodiments, the map in dynamic view mode can be automatically enlarged by a small factor, e.g., 2× to 4×. When enlarging the map, the map tiles for the displayed map are not replaced with other map tiles that provide a zoomed in view of the geographic region. Instead, the map tiles used to present the map of the geographic region remain the same but are simply enlarged. Additionally, once in the dynamic view mode, map label text sizes can be increased to aid readability and additional points of interests can be revealed, for example. To make room (e.g., in terms of pixels of a display screen), some normal view mode details can be removed so that the additional dynamic view mode details can be provided, where both the normal view mode details and the additional dynamic view mode details are shown at the same zoom level of the map. For example, in some instances, three-dimensional models of buildings shown in the map can be collapsed to provide the user with a more complete, unobstructed view.

The digital map can be presented on a display screen of a computing device. In some embodiments, the user operating the computing device can initiate the dynamic view mode by performing a gesture, for example, a double-tap gesture on the back of the computing device. The double-tap gesture can be detected by the computing device, for example, using data obtained from one or more inertial sensors (e.g., accelerometers and/or gyroscopes) in the computing device, one or more microphones in the computing device, one or more cameras in the computing device, and/or any other sensors the computing device can receive data from. Once in the dynamic view mode, the computing device can use various approaches to head tracking to discover the location of the user's face to determine if the user is attempting to inspect finer details of the map. For example, if the user is now holding the display screen of the computing device closer to the user's face, then a determination can be made that the user is attempting to learn more about features in the map.

One advantage of enabling the dynamic view mode, as described above, is allowing the user to view details of a map being displayed without requiring additional navigation. In various embodiments, the manner in which the map is enhanced, e.g., the types of features that are labeled, can be customized for the user viewing the map.

Other advantages, variations, and functions are described and suggested below as may be provided in accordance with the various embodiments.

Figure 1B:
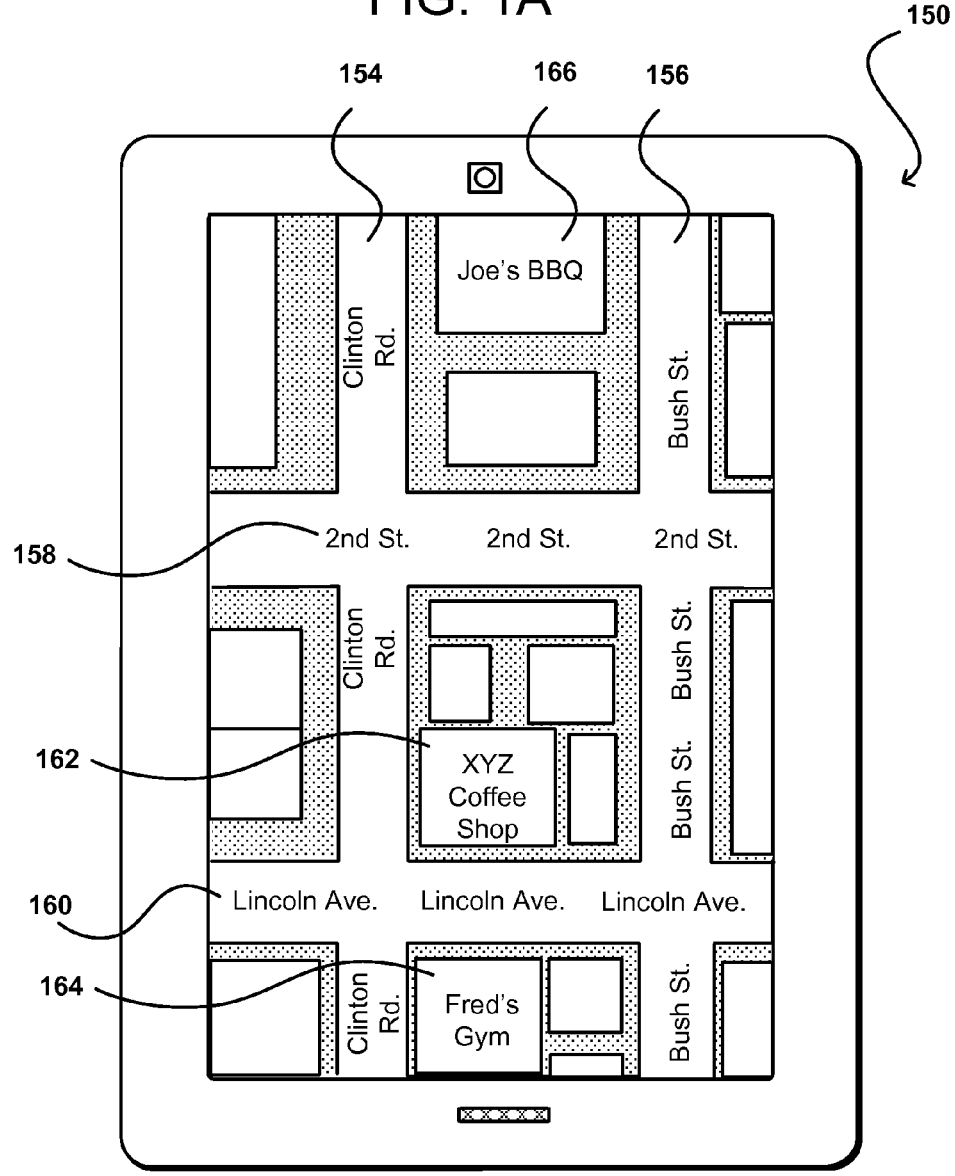
FIG. 1B illustrates an example interactive map that was rendered in the normal view mode described in FIG. 1A.

FIG. 1A illustrates a user 102 interacting with a computing device 104 to access an interactive geographic map, e.g., the frame 102 for the interactive geographic map, in a normal view mode, as described in reference to FIG. 1B. Although a portable computing device, e.g., a smart phone, an electronic book reader, or tablet computer, is shown, other types of computing devices can be configured to perform the operation described in this specification. These computing devices can include, for example, notebook computers, personal data assistants, video gaming consoles or controllers, portable media players, and wearable computers, e.g., smart watches, smart glasses, among others. In this example, the computing device 104 includes an imaging element 106, e.g., a camera, that is positioned on a side or corner of the computing device 104.

The camera 106 is configured to capture image information of at least a portion of the user 102 while the user is viewing content being displayed on a display screen of the computing device 104. For example, the camera 106 is positioned on the front of the device 104 so that an angular capture range 108 of the camera 106 can image at least a portion of the user 102 while the user 102 is viewing content being displayed on the display screen of the computing device 104. The captured image information of the user 102 can be used by the computing device 104 to determine a relative position and orientation of the user 102 with respect to the computing device 104. The determined position or orientation of the user 102 can be used by the computing device 104 to adjust the display of content, e.g., views for interactive geographic maps, on the display screen of the computing device 104.

FIG. 1B illustrates an example frame 150 for an interactive geographic map that was rendered using the normal view mode. The frame 150 is displayed on a display screen of a computing device, e.g., the device 104 and 602, as described in reference to FIGS. 1A and 6, respectively. The frame 150 was rendered using, for example, map data that was received from a map search system 505, as described in reference to FIG. 5. In other words, the frame 150 is the portion of the interactive geographic map that is visible on the display screen of the computing device 104 at any given point.

The interactive geographic map shown in FIG. 1B is rendered using a normal view mode, as described above. That is, the user 102 can interact with the map through the computing device 104 to perform various navigation options to manually access different information in the map for example, by adjusting the zoom level or scrolling to a different region in the map.

As shown in FIG. 1B, the frame 150 is showing map labels 154 for a street "Clinton Rd.", map labels 156 for a street "Bush St.", map labels 158 for a street "2nd St.", map labels 160 for a street "Lincoln Ave.", a map label 162 for a coffee shop "XYZ Coffee Shop", a map label 164 for a gymnasium "Fred's Gym", and a map label 166 for a restaurant "Joe's BBQ."

Figure 2A:
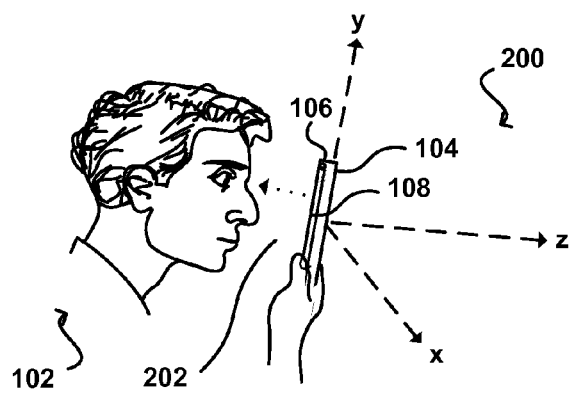
FIG. 2A illustrates the user operating the computing device in a dynamic view mode.
Figure 2B:
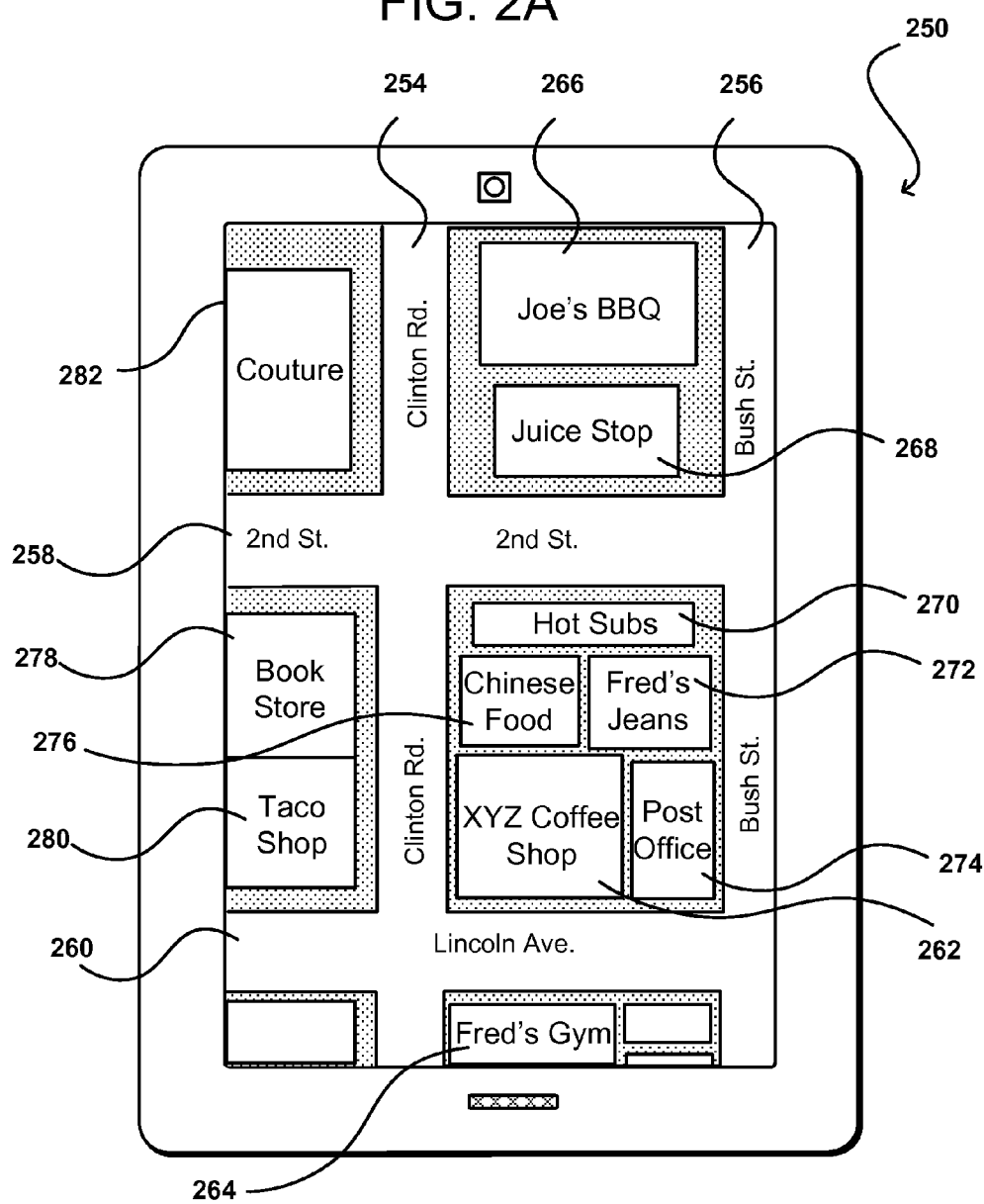
FIG. 2B illustrates an example interactive map that was rendered in the dynamic view mode described in FIG. 2A.

FIG. 2A illustrates the user 102 interacting with the computing device 104 to access the interactive geographic map, e.g., the frame 202 for the interactive geographic map, using a dynamic view mode, as described in reference to FIG. 2B. The user 102 operating the computing device has initiated the dynamic view mode.

In some embodiments, dynamic view mode is initiated when a double-tap gesture is detected on the back of the computing device 104. Once in dynamic view mode, the view of the interactive geographic map remains the same until the computing device 104 detects that the user is attempting to learn about additional details in the map, for example, by bringing the display screen of the computing device 104 closer to the user's face. The displayed map can be modified in different ways as the user 102 moves the display screen of the computing device 104 closer to the user's face or further away from the user's face. For example, as shown in FIG. 2A, the distance 202 between the user's face and the computing device 104 is now reduced. In response, the display screen of the computing device 104 is updated to display a different view of the interactive geographic map, as described in reference to FIG. 2B. Depending on the embodiment, once in the dynamic view mode, the displayed map can be modified in a number of ways. For example, the map can be modified by showing different types of information, e.g., displaying traffic information, in the map or the map can be modified by changing certain aspects of the map, e.g., changing the text size of map labels shown in the map.

In some embodiments, a Boolean mode is configured to modify the displayed map in response to the user 102 being a threshold distance from the display screen of the computing device 104. For example, once the distance of the user 102 from the computing device 104 crosses a threshold distance, the displayed map can be modified to superimpose respective indoor maps over buildings or structures that are being shown in the map. The displayed map can also be modified to show various conditional information that relates to the geographic region being shown in the map. For example, the map can show route times from the user's current geographic location to the geographic region being shown in the map. In another example, the map can show transportation options, e.g., buses or subway, available at the geographic region and their respective arrival, departure, or transit times.

In some embodiments, an analog mode is used to modify aspects of the displayed map gradually as the distance between the user 102 and the display screen of the computing device 104 is increased or decreased. For example, the size of the text of map labels being shown in the displayed map can be gradually increased as the distance of user 102 from the display screen of the computing device 104 decreases. For example, increasing the text size can involve displaying the same text using additional pixels (e.g., increasing a font size of the text). As the size of the text for map labels increases, the displayed map can also be updated to remove certain map labels from the map to accommodate the increased size of the text for the map labels. Similarly, the size of the text of map labels being shown in the displayed map can be gradually decreased as the distance of user 102 from the display screen of the computing device 104 increases. For example, decreasing the text size can involve displaying the same text using fewer pixels (e.g., decreasing a font size of the text). Depending on the embodiment, the size of the text can be associated with a minimum size and a maximum size.

In various embodiments, both at least one Boolean mode and at least one analog mode can be used to modify aspects of the displayed map. For example, if the distance between the user 102 is and the computing device 104 is at a first threshold, e.g., one foot, the font size of the text for map labels in the displayed map can be set at a first size, e.g., 6 point. As the distance between the user 102 and the computing device 104 decreases, so can the font size of the text for the map labels. Once the distance reaches a second threshold, e.g., 6 inches, the font size of the text can be set to its maximum size, e.g., 12 point. As the distance between the user 102 and the computing device 104 decreases further to a third threshold, e.g., 3 inches, additional information can be shown in the displayed map including, for example, route times for nearby transportation, traffic information, or indoor maps, as described above.

In some embodiments, if the distance between the user 102 is and the computing device 104 is at a first threshold, e.g., one foot, then the device is configured to display the map in dynamic view mode. Once the distance reaches a second threshold, e.g., 6 inches, zoom capability for the map being presented in dynamic view mode is disabled while certain map navigation features (e.g., panning and/or scrolling) are enabled.

The display screen of the computing device 104 can be updated to display a different view of the interactive geographic map in response to detecting the double-tap gesture on the back of the computing device 104 without performing additional head tracking. Naturally, other types of gestures and/or options other than the double-tap gesture can be performed or selected to initiate the dynamic view mode.

FIG. 2B illustrates an example frame 250 for an interactive geographic map that was rendered using the dynamic view mode. The frame 250 is displayed on the display screen of the computing device, e.g., the device 104 and 602, as described in reference to FIGS. 2A and 5, respectively. The frame 250 was rendered using, for example, map data that was received from a map search system 505, as described in reference to FIG. 5. In other words, the frame 250 is the portion of the interactive geographic map that is visible on the display screen of the computing device 104 at any given point.

The interactive geographic map shown in FIG. 2B rendered using a dynamic view mode, as described above. Once in dynamic view mode, the map shown in FIG. 1B is presented using a different view that is enhanced to provide additional details without necessarily changing the actual region shown in the map. For example, in dynamic view mode, specific information, e.g., points of interest, can be highlighted to be more strongly suggested while other types of information or features can fade away. In other words, the map view in dynamic view mode is not for navigation, e.g., zooming or scrolling, but rather for showing generally the same map with additional details.

Depending on the embodiment, the map can be automatically enlarged by a small factor, e.g., 2× to 4×, as the user's face 102 is brought closer to the computing device 202. When enlarging the map, the map tiles for the displayed map are not replaced with other map tiles that provide a zoomed in view of the geographic region. Instead, the map tiles used to present the map of the geographic region remain the same but are simply enlarged. Additionally, depending on the embodiment, once in the dynamic view mode, map label text sizes can be increased to aid readability, additional points of interests can be revealed, 3D building models can be lowered or collapsed, e.g., 3D models can be collapsed to 2D models or the length of 3D models along the z-axis can simply be reduced, to provide an unobstructed view of the geographic region presented in the map, streets in the map can be highlighted, for example, using colors or designs, and street traffic can be shown automatically. Thus, the view of the map rendered in dynamic view mode would provide the user with more detailed information that is typically not shown, for example, in normal view mode.

For example, in contrast to the map rendered using normal view mode, as shown in FIG. 1B, the map in FIG. 2B is rendered in dynamic view mode. Consequently, the frame 250 is showing fewer map labels 254 for a street "Clinton Rd.", fewer map labels 256 for a street "Bush St.", fewer map labels 258 for a street "2nd St.", and fewer map labels 260 for a street "Lincoln Ave." Similar to the frame 150, as described in reference to FIG. 1A, the frame 250 is showing a map label 262 for a coffee shop "XYZ Coffee Shop", a map label 264 for a gymnasium "Fred's Gym", and a map label 266 for a restaurant "Joe's BBQ."

However, the frame 250 also shows additional information that was not originally included in the frame 150. For example, the frame 250 includes a map label 268 for a point of interest "Juice Stop", a map label 270 for a point of interest "Hot Subs", a map label 272 for a point of interest "Fred's Jeans", a map label 274 for a point of interest "Post Office", a map label 276 for a point of interest "Chinese Food", a map label 278 for a point of interest "Book Store", a map label 280 for a point of interest "Taco Shop", and a map label 282 for a point of interest "Couture".

In some embodiments, the dynamic view mode can be deactivated using a gesture, e.g., by performing another double-tap gesture on the back of the computing device 104, or by selecting an option to return to normal view mode. Naturally, once the dynamic view mode is deactivated, the view of the map would revert to show information that was shown in normal view mode, as described in reference to FIG. 1B.

Figure 3A:
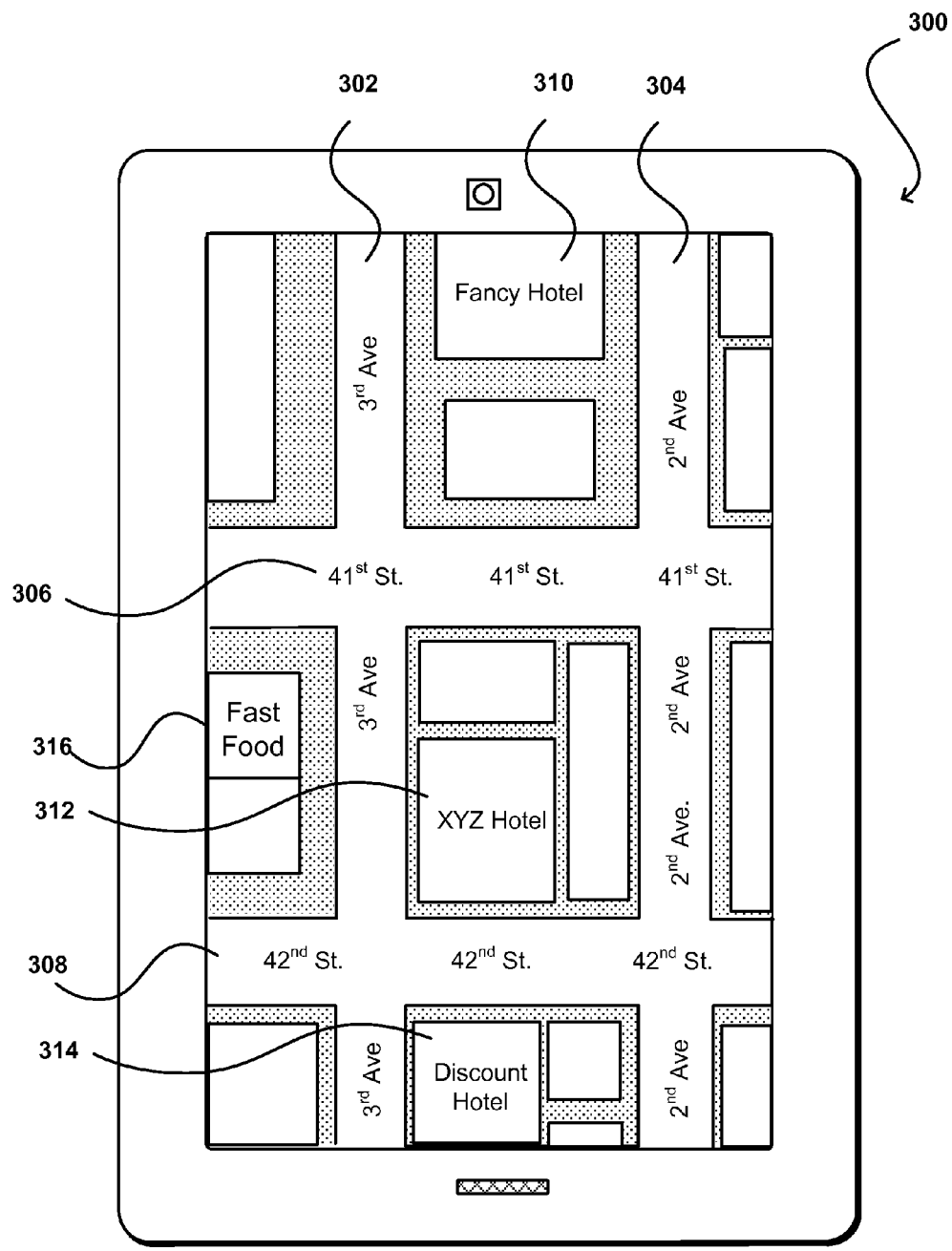
FIG. 3A illustrates an example interactive map that was rendered in a normal view mode.

FIG. 3A illustrates an example frame 300 for an interactive geographic map that was rendered using a normal view mode. The frame 300 is displayed on the display screen of the computing device, e.g., the device 104 and 602, as described in reference to FIGS. 1A and 5, respectively. The frame 300 was rendered using, for example, map data that was received from a map search system 505, as described in reference to FIG. 5. In other words, the frame 300 is the portion of the interactive geographic map that is visible on the display screen of the computing device 104 at any given point.

The interactive geographic map shown in FIG. 3A is rendered using a normal view mode, as described above. That is, the user can interact with the frame 300 through the computing device to perform various navigation options to manually access different information in the map for example, by adjusting the zoom level or scrolling to a different region in the map.

As shown in FIG. 3A, the frame 300 is showing map labels 302 for a street "$3^{rd}$ Ave", map labels 304 for a street "$2^{nd}$ Ave", map labels 306 for a street named "40 St", and map labels 308 for a street named "$42^{nd}$ St". The frame 300 also includes a map label 310 for a point of interest "Fancy Hotel", a map label 312 for a point of interest "XYZ Hotel", a map label 314 for a point of interest "Discount Hotel", and a map label 316 for a point of interest "Fast Food."

Figure 3B:
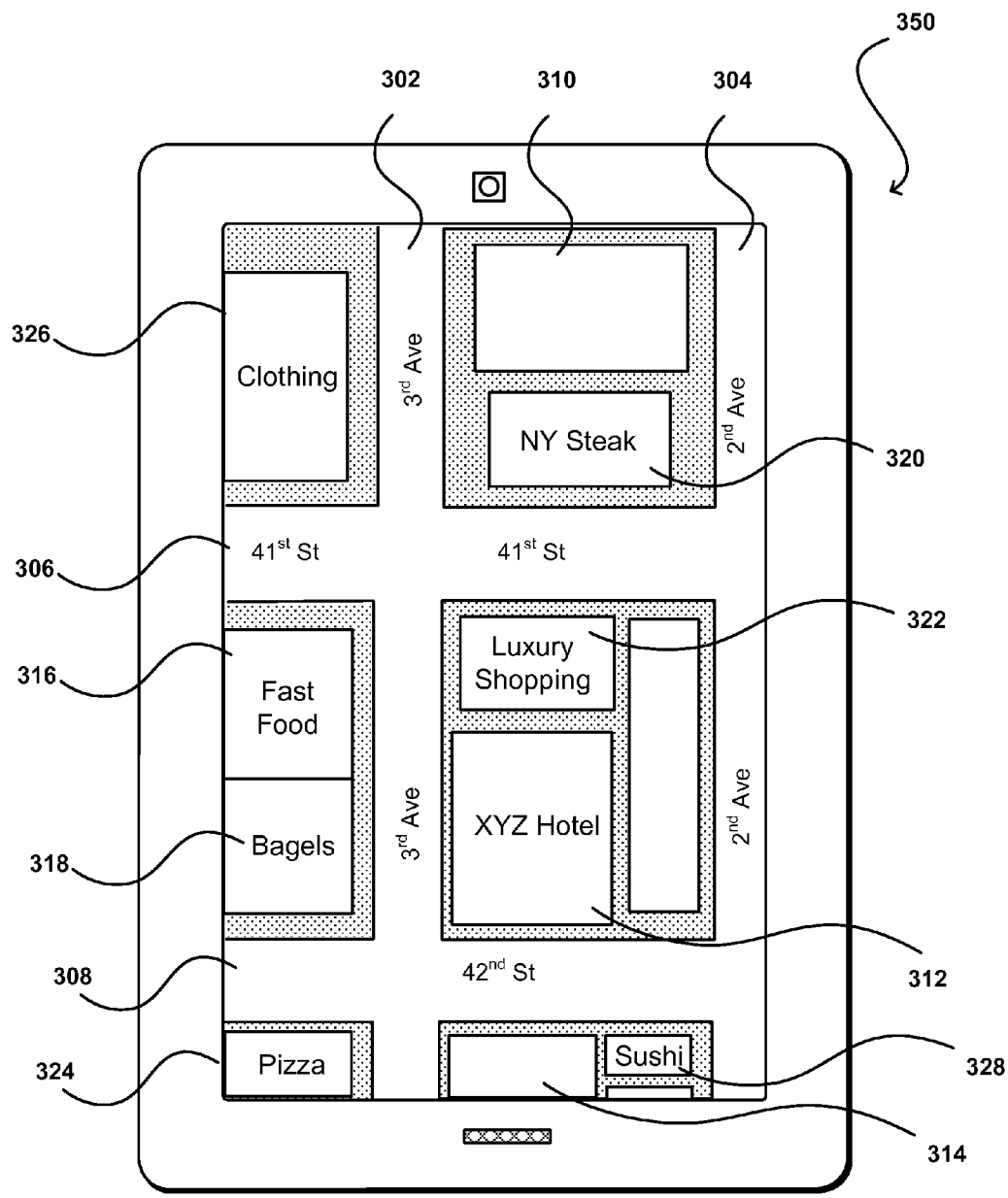
FIG. 3B illustrates an example interactive map that was rendered in a dynamic view mode.

FIG. 3B illustrates an example frame 350 for an interactive geographic map that was rendered using the dynamic view mode. The frame 350 is displayed on the display screen of the computing device, e.g., the device 104 and 602, as described in reference to FIGS. 2A and 5, respectively. The frame 350 was rendered using, for example, map data that was received from a map search system 505, as described in reference to FIG. 5. In other words, the frame 250 is the portion of the interactive geographic map that is visible on the display screen of the computing device 104 at any given point.

The interactive geographic map shown in FIG. 3B rendered using a dynamic view mode, as described above. Once in dynamic view mode, the map shown in FIG. 3A is presented using a different view that is enhanced to provide additional details without necessarily changing the actual region shown in the map. For example, as compared to FIG. 3A, the frame 350 in FIG. 3B is showing fewer map labels 302 for a street "$3^{rd}$ Ave", fewer map labels 304 for a "$2^{nd}$ Ave", fewer map labels 306 for a street named "40 St", and fewer map labels 308 for a street named "$42^{nd}$ St". The frame 300 also includes a map label 312 for a point of interest "XYZ Hotel", and a map label 316 for a point of interest "Fast Food". However, the map of FIG. 3B, as rendered in dynamic view mode, also displays a map label 318 for a point of interest "Bagels", a map label 320 for a point of interest "NY Steak", a map label 322 for a point of interest "Luxury Shopping", a map label 324 for a point of interest "Pizza", a map label 326 for a point of interest "Clothing", and a map label 328 for a point of interest "Sushi".

In some embodiments, the view of the map shown in dynamic view mode is modified based on information describing the user operating the computing device. For example, if it is known that the user operating the computing device is staying at the "XYZ Hotel" 312, then the frame 350 rendered in dynamic view mode may not display labels for features corresponding to other hotel accommodations, or may display the other hotels in a lowered or collapsed 3D state. This rendering allows the user to see details for other points of interest that the user may be more interested in seeing.

Thus, in FIG. 3B, the map label 310 for a point of interest "Fancy Hotel" and the map label 314 for a point of interest "Discount Hotel" is not displayed. In some embodiments, once in dynamic view mode, the graphic representing the user's hotel can be enlarged or rendered using a different color to make it easier for the user to orient him- or herself.

Figure 4:
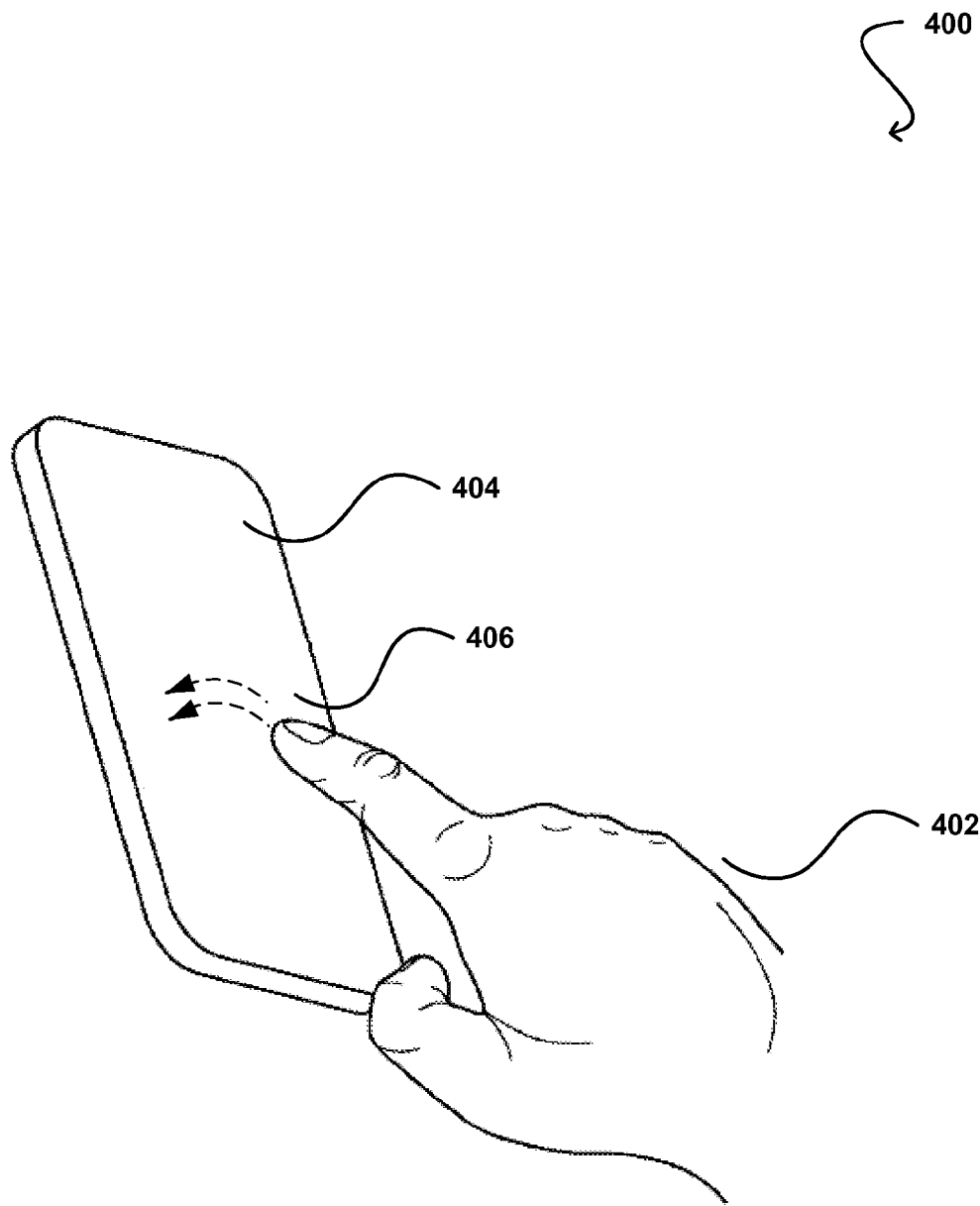
FIG. 4 illustrates a user performing a double-tap gesture on the back of a computing device.

FIG. 4 illustrates a user 402 performing a double-tap gesture 406 on the back of a computing device 404. As described above, in some embodiments, the user 402 operating the computing device can initiate the dynamic view mode by performing the double-tap gesture 406 on the back of the computing device 404. The double-tap gesture 406 involves the user 402 tapping the back of the computing device twice using an implement, e.g., a finger. The double-tap gesture can be detected by the computing device 404, for example, using data obtained from one or more inertial sensors (e.g., accelerometers and/or gyroscopes) in the computing device 404, one or more microphones in the computing device 404, one or more cameras in the computing device 404 and/or any other sensors the computing device can receive data from. In some embodiments, the double-tap 406 is detected by the computing device independent from a touch screen of the computing device. Once in the dynamic view mode, the computing device 404 can use various approaches to head tracking to discover the location of the user's face to determine if the user is attempting to inspect finer details of the map, as described above.

Figure 5:
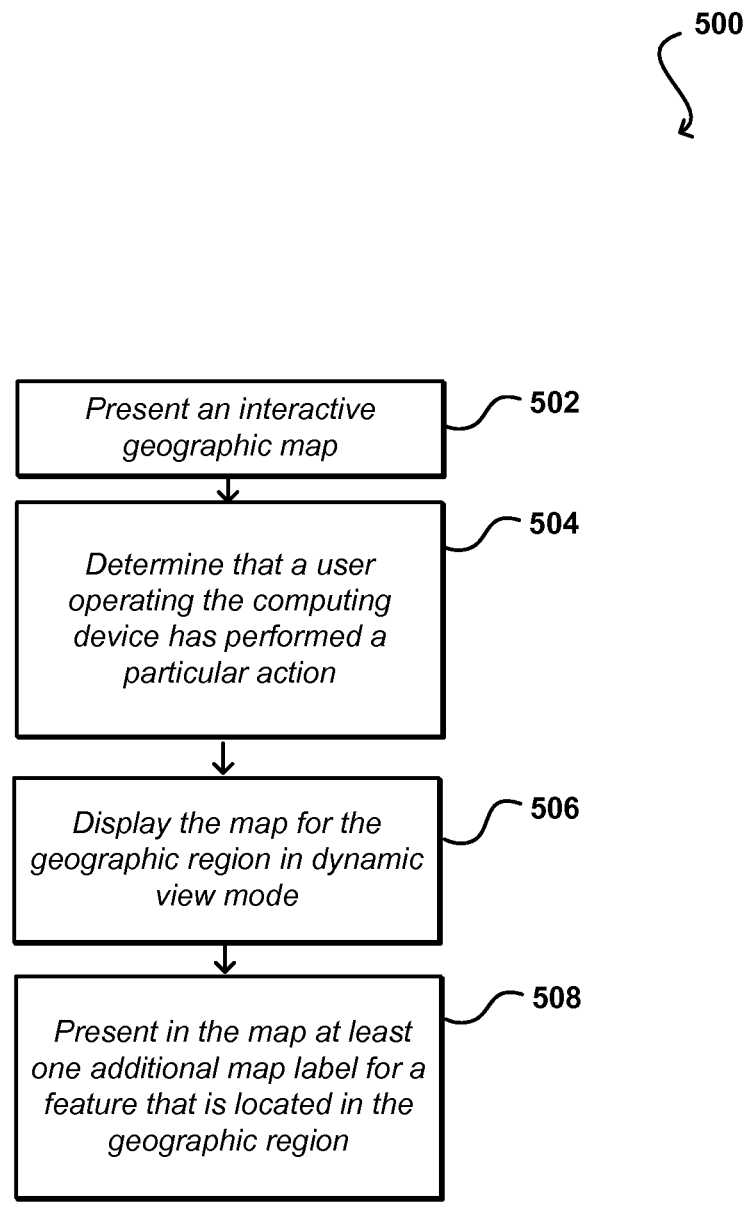
FIG. 5 is a flow diagram of an example process for customizing a map view.

FIG. 5 is a flow diagram 500 of an example process for customizing a map view. The example process 500 is provided merely as an example and additional or fewer steps may be performed in similar or alternative orders, or in parallel, within the scope of the various embodiments described in this specification.

A computer device can present on a display screen an interactive geographic map of a geographic region 502. The interactive geographic map can display map labels that each describe a feature that is located in the geographic region. The computing device can determine that a user operating the computing device has performed a particular action 504. For example, the particular action can be configured to initiate a dynamic view mode for the interactive geographic map. The particular action can involve the user performing a double-tap gesture on the back of the computing device. In addition, the particular action can involve the user moving the display screen of the computing device closer to the user's face.

Next, the computing device displays the map for the geographic region in the dynamic view mode 506. Once in the dynamic view mode, the map for the geographic region is modified to include at least one additional map label for a feature that is located in the geographic region 508. Further, while in the dynamic view mode, navigation of the displayed map can be disabled. That is, the user is unable to scroll or adjust a zoom level of the map.

Figure 6:
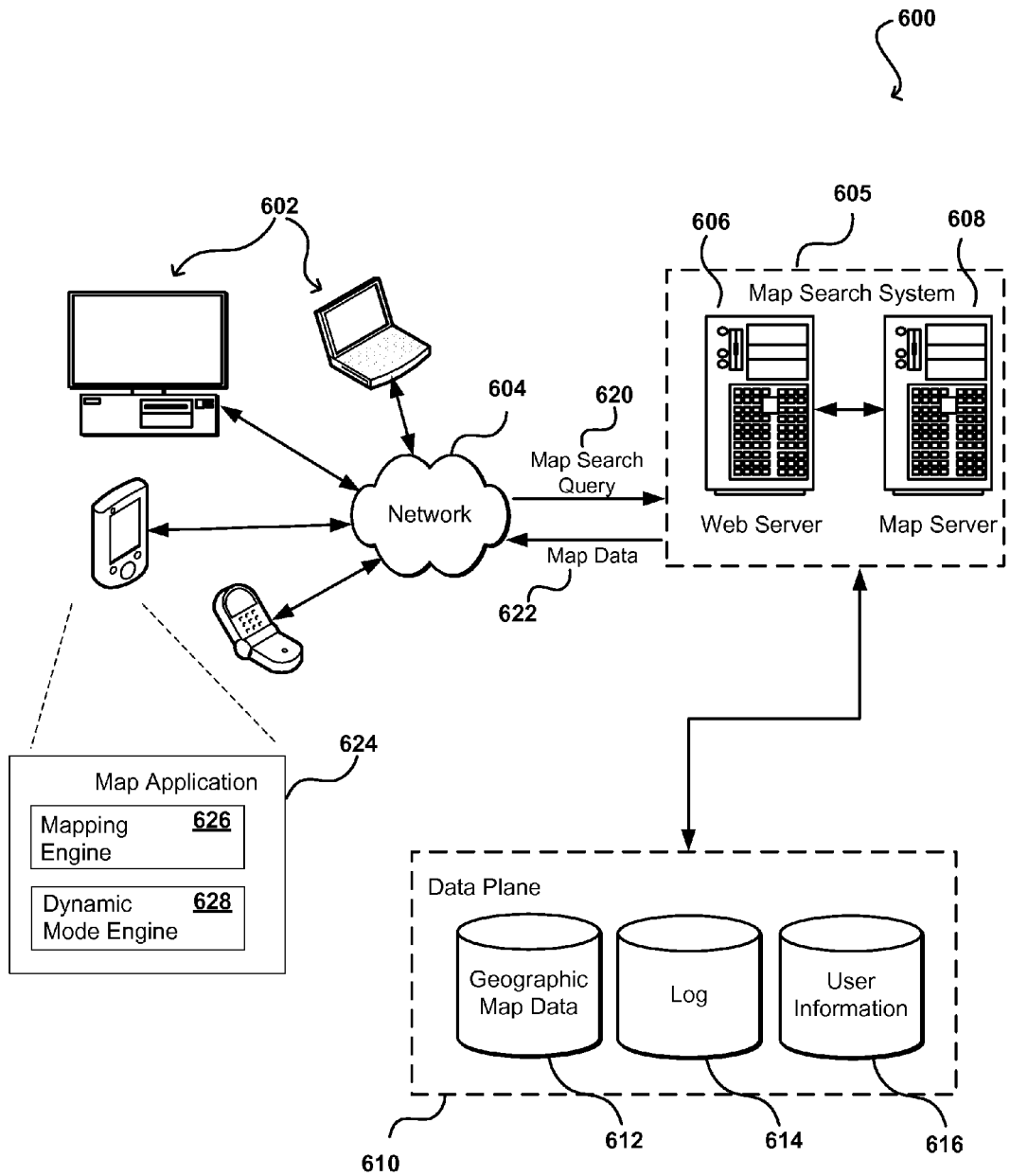
FIG. 6 illustrates an example of an environment for implementing aspects in accordance with various embodiments.

FIG. 6 illustrates an example of an environment 600 for implementing aspects in accordance with various embodiments. Although a web-based environment is described for purposes of explanation, different environments may be used, as appropriate, to implement various embodiments.

The example environment 600 includes a map search system 605 and a data plane 610. The map search system 605 includes at least one web server 606 and at least one map server 608, as described below. The map search system 605 is an example of an interactive geographic map retrieval system implemented as computer programs on one or more computers in one or more locations, in which the systems, components, and techniques described below can be implemented.

A user can interact with the map search system 605 through a client device 602. For example, the client device 602 can be a computer coupled to the map search system 605 through a data communication network 604, e.g., the Internet. In some instances, the map search system 605 can be implemented on the client device 602, for example, through a software application executing on the client device 602. The client device 602 generally includes a memory, e.g., a random access memory (RAM), for storing instructions and data, and a processor for executing stored instructions. The client device 602 can be any appropriate device operable to send and receive requests, messages, or other types of information over the network 604. The client device 602 can also include a display screen though which a user interacting with the client device can view information, e.g., interactive geographic maps. Some examples of client devices include personal computers, cellular phones, handheld messaging devices, laptop computers, set-top boxes, personal data assistants, electronic book readers, tablet devices, and the like.

The network 604 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The client device 602 can communicate over the network using wired or wireless connections, and combinations thereof.

A user can use the client device 602 to submit a map search query 620 to the map search system 605. The map search query 620 can request an interactive geographic map for a particular geographic region that is identified by a geographic address, e.g., a street address, city, state, zip code, geographic coordinates, or a name of a point of interest. When the user submits the map search query 620, the query 620 may be transmitted through the network 604 to a map server 608 within the map search system 605. The map server 608 responds to the query 620 by using, for example, the geographic map data 612, to identify map data 622 describing a geographic region that satisfies the query 620. The map server 608 sends the map data 622 through the network 604 to the client device 602 for presentation to the user.

The map data 622 can include data describing a map of the particular geographic region. The map data 622 can be used, for example, by a client device 602, to generate an interactive geographic map that provides a visual, e.g., two-dimensional or three-dimensional, representation of the particular geographic region.

The map data 622 can describe the map of the particular geographic region using, for example, a collection of map tiles at a specified zoom level. For example, in response to a map search query for the city of San Francisco, the map server 608 can identify a collection of map tiles that collectively describe a map of the city of San Francisco at a specified zoom level. Each map tile in the collection visually describes a portion of the map of San Francisco at the specified zoom level. Different types of maps of a geographic region may be provided depending on the user's selection including, for example, road maps, satellite maps, a hybrid maps, e.g., a combination of normal and satellite views, or physical maps based on terrain information.

Further, the map data 622 can also include a collection of labels, e.g., text labels, icons, or both, for the requested geographic region. Each label can describe a feature that is located in the requested geographic region. Some examples of features include line features, e.g., roads and rivers, area features, e.g., countries, parcels, forests, and lakes, and point features, e.g., cities and points of interest. The map data 622 can also include, for each label, respective coordinates that specify a location at which the label is to be positioned in an interactive geographic map. Coordinates for labels can be specified by a user, e.g., a cartographer, or may be generated by the map server 608. For example, a label "San Francisco" can be assigned coordinates so that the label is positioned in a centrally located map tile in a collection of map tiles for the city of San Francisco.

In some embodiments, the map server 608 generates respective ranking scores for labels that correspond to a particular geographic region. A label's ranking score generally indicates the ranking of the label for a particular geographic region. Label ranking scores can be used, for example, to prioritize the selection of labels to be displayed in an interactive geographic map. Generally, the higher the ranking score, the more relevant a label is to a particular geographic region. For example, businesses "ABC Inc.", "B2B Corp.", and "B2C P.C." can all be located in the same building in a particular geographic region. Each business can have a respective label that describes the business and a respective ranking score associated with the label. For example, labels for the businesses "ABC Inc.", "B2B Corp.", and "B2C P.C." can be respectively scored 0.7, 0.4, and 0.8. When generating an interactive geographic map for the particular geographic region, the client device 602 can evaluate the respective scores associated with the labels to select labels for display in the interactive geographic map. In the example above, the client device 602 selects the label "B2C P.C." for display at the building's location in the interactive geographic map, since that label has the highest ranking score.

After receiving the map data 622 from the map server 608, and through the network 604, a software application, e.g., web browser or a map application 624, running on the client device 602 renders an interactive geographic map for the requested geographic region using the map data 622. For example, a mapping engine 626 in the map application 624 can position map tiles, in a collection of map tiles describing the requested geographic region, for display on a display screen of the client device 602. Additionally, the mapping engine 626 can evaluate the map data 622 to select labels to be displayed in the interactive geographic map. As described above, the mapping engine 626 can select labels for display based on the respective ranking scores for the labels.

In some embodiments, the mapping application 624 includes a dynamic mode engine 628 that is configured to render the interactive geographic map using a dynamic view mode. In some embodiments, the dynamic mode engine 628 is configured to determine when the dynamic view mode has been invoked, for example, using a double-tap gesture and performing head tracking techniques, as described in this specification.

The mapping application 624 can be configured to render the map in different ways. For example, the mapping application 624 can render the map in normal view mode in which normal view mode details are shown. Typically, this involves using generally known computerized methods can be used to automatically place map labels near features in the map and in which a user can navigate the map, e.g., through gestures or increasing the zoom level. The mapping application 624 can also render the map in dynamic view mode which provides additional dynamic view mode details to be shown about the map being presented. For example, in the dynamic view mode, zoom capability for the map may be disabled and certain features in the map may be labeled while others are not, or certain features in the map may be labeled differently (e.g., using a different font or size) than others. When in dynamic view mode, the mapping application 624 can remove from display certain normal view mode details to make room (e.g., in terms of pixels or screen space) so that the dynamic view mode details can be presented. Typically, dynamic view mode details are not presented while the device is in normal view mode. Similarly, normal view mode details are not presented while the device is in dynamic view mode. In some embodiments, the mapping application 624 can render the map in an agnostic view mode that presents some or all normal view mode details and some or all dynamic view mode details.

Once the dynamic view mode has been initiated, the dynamic mode engine 628 can generate a different view of the interactive geographic map by adjusting ranking scores of labels that can be included in the interactive geographic map. For example, there may be hundreds of labels that are not drawn in the interactive geographic map for a particular region in the map and based on the current zoom level of the map. Generally, map labels having the highest ranking scores are displayed. Whenever a collision between two map labels occurs, the map label with the lower ranking score will be removed. Thus, to add or remove map labels, the dynamic mode engine 628 can boost or reduce the respective ranking scores for certain types of features in the map so that labels for certain features, e.g., points of interest, that would normally not be shown are shown in the dynamic view mode whereas labels for certain features, e.g., streets, that would normally be shown are no longer shown, or are labeled less frequently, in the dynamic view mode. For example, in some embodiments, when in the dynamic view mode, ranking scores for map labels corresponding to roads or streets, which would typically be shown in normal view mode, are decreased. In some embodiments, when in the dynamic view mode, ranking scores for map labels corresponding to features that are near the center, e.g., with a threshold radius of the center, of the displayed map are increased. In contrast, in normal view mode, map labels corresponding to features near the center are not necessarily given such priority.

In some embodiments, the dynamic mode engine 624 can perform additional operations to change the types and/or amount of information shown in the map rendered in the dynamic view mode. For example, 3D models of buildings shown in the map can be lowered or collapsed, shadows for features in the map can be removed, traffic can automatically be shown, and text sizes for labels can be increased or decreased. Other parameters associated with labels can also be adjusted once in the dynamic view mode. For example, a parameter for specifying how close labels can be displayed to one another in the map can be relaxed to fit additional labels in the view of the map in the dynamic view mode.

In some embodiments, the dynamic mode engine 624 can change the types of information that is displayed based on the identity of the user. For example, based on the user's preferences, the dynamic mode engine 624 utilize a recommendation engine to identify features that the user might want to visit, and increase the ranking scores for the labels for these features. For example, if the user's preferences indicate that the user likes sushi restaurants, then ranking scores for labels corresponding to features in the map that are associated with sushi restaurants are increased. However, the user can always opt-out of this feature to view the map in the dynamic view mode, as described above. In some embodiments, the dynamic mode engine 624 can change the types of information that is displayed based on user feedback. In some embodiments, the types of information that is displayed is determined based on features in the map that the user selected, e.g., clicked or tapped with a finger. For example, if the user had selected a feature in the map corresponding to a restaurant, then the view of the map can be updated to display more labels for features corresponding to restaurants.

In some embodiments, the web server 606, map server 608, and similar components, can be considered to be part of the data plane 610. The handling of all requests and responses, as well as the delivery of content between the client device 602 and the map server 608, can be handled by the web server 606. The web server 606 and map server 608 are merely example components. However, more or fewer components can be used as structured code can be executed on any appropriate device or host machine as discussed elsewhere herein.

The data plane 610 includes one or more resources, servers, hosts, instances, routers, switches, data stores, other similar components, or a combination thereof. The resources of the data plane 610 are not limited to storing and providing access to data. Indeed, there may be several map servers, layers, or other elements, processes, or components, which may be chained or otherwise configured, and which can interact to perform tasks including, for example, obtaining data from an appropriate data store. In some embodiments, the term "data store" refers to any device or combination of devices capable of storing, accessing, and retrieving data, which may include any combination and number of data servers, databases, data storage devices, and data storage media, in any standard, distributed, or clustered environment.

The data stores of the data plane 610 can include several separate data tables, databases, or other data storage mechanisms and media for storing data relating to a particular aspect. For example, the data plane 610 illustrated includes mechanisms for storing geographic map data 612 and user information 616, which can be used to serve content. The data plane 610 is also shown to include a mechanism for storing log data 614, which can be used for purposes such as reporting and analysis. The data plane 610 is operable, through logic associated therewith, to receive instructions from the map server 608 and to obtain, update, or otherwise process data, instructions, or other such information in response thereto, as described above.

Each server typically includes an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment including several computer systems and components that are interconnected through one or more communication links, using one or more computer networks or direct connections. However, the system described above can be configured to operate equally well using fewer or a greater number of components than are illustrated in FIG. 6. Thus, the system 600 in FIG. 6 is provided merely as one example, and does not limit the scope of the disclosure.

FIGS. 7A-E illustrate an example approach for detecting and locating an object using a computing device, e.g., the computing device 104.

Figure 7A:
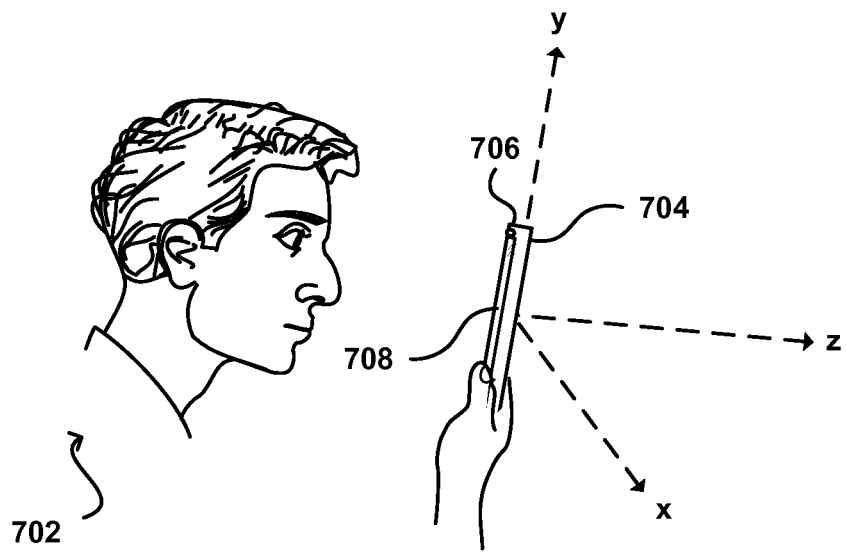
FIGS. 7A-F illustrate an example approach for detecting and locating an object using a computing device.

In FIG. 7A, a user 702 is shown viewing a display screen 708 of the computing device 704, e.g., the computing device 104, as described in reference to FIG. 1. The computing device 704 includes at least one imaging element, e.g., a camera 706.

In the example of FIG. 7A, the camera 706 is located on the front of the computing device 704. However, the cameras need not be placed in any particular position relative to the computing device 704 to perform the operations described in this specification. For example, in some instances, the computing device 704 may include a first camera on the front of the computing device 704 that is configured to detect and track objects that are positioned in front of the computing device 704 and second camera on the back of the computing device 704 that is configured to detect and track objects that are positioned in the back of the computing device 704. In another example, the computing device 704 can have the first camera and the second camera on the front of the computing device 704. In this example, the first and second cameras can be used in combination to detect and track objects, e.g., using epipolar geometric techniques, as described below.

The computing device 704 can include other types of imaging elements including, for example, ambient light sensors and Infrared (IR) sensors. The computing device 704 can also include various sensors that are configured to determine a motion, or orientation, of the computing device 704. For example, the computing device 704 can include an IMU unit that includes various sensors, e.g., accelerometers, gyroscopes, magnetometers, inclinometers, proximity sensors, distance sensors, depth sensors, range finders, and ultrasonic transceivers.

For example, a software application executing on the computing device 704 can be configured to detect and track objects that are in an image plane of the computing device 704 using, for example, one or more computer vision algorithms. The image plane is defined by a field of view that is observable by the camera 706 of the computing device 704 based on the position of the computing device. Thus, as the position of the computing device 704 changes, so does the image plane. Naturally, as the computing device 704 is moved, the positions of objects in the image plane will change with respect to the movement of the computing device 704.

Figure 7B:
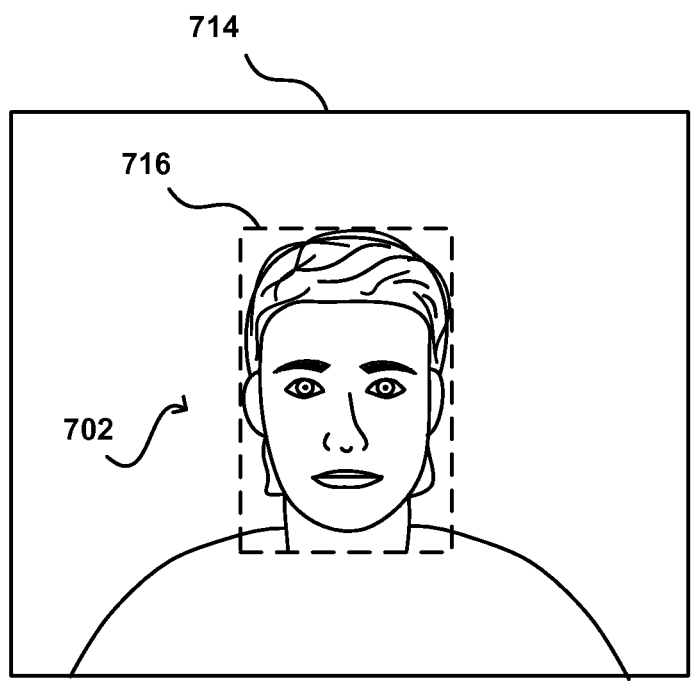

FIG. 7B shows an image 714 of the user 702 that was captured using the camera 706 of the computing device 704. The user 702 is shown being positioned in front of the display screen 708 of the computing device 704.

Depending on the embodiment, when initially detecting and tracking the user 702, a threshold number of images of the user 702 may be captured using the camera 706 at different time intervals. In some embodiments, the time intervals vary based on the application for which an object is being tracked. For example, in applications that require a higher frame rate, e.g., games, the object may be tracked between image frames more frequently.

Once the image 214 is captured, the computing device 704 evaluates the image 714 using one or more computer vision algorithms, e.g., face detection algorithms, to identify the user 702. For example, the user 702 can be identified by determining a location of the face of the user 702 in the image 714 and evaluating the characteristics of the face. The location of the face can be described using, for example, a bounding box 716 that defines the boundaries of the face.

In some embodiments, the computing device 104 is configured to generate an object model that describes the features of the object being tracked. For example, when generating an object model of a face, the computing device 104 can apply generally known algorithms to determine a three-dimensional geometry of the face, for example, by identifying facial features, e.g., nose, eyes, eyebrows, and lips. The facial geometry can be used to detect and track the face in subsequent images. The face can be detected and tracked between a first and second image, for example, by measuring a similarity, e.g., normalized cross-correlation, of the facial geometry in the first frame and the facial geometry in the second frame.

Depending on the embodiment, other types of generally known object detection algorithms or classifiers can be used to identify respective objects including, for example, human heads, human faces, human eyes, and human nose.

Figure 7C:
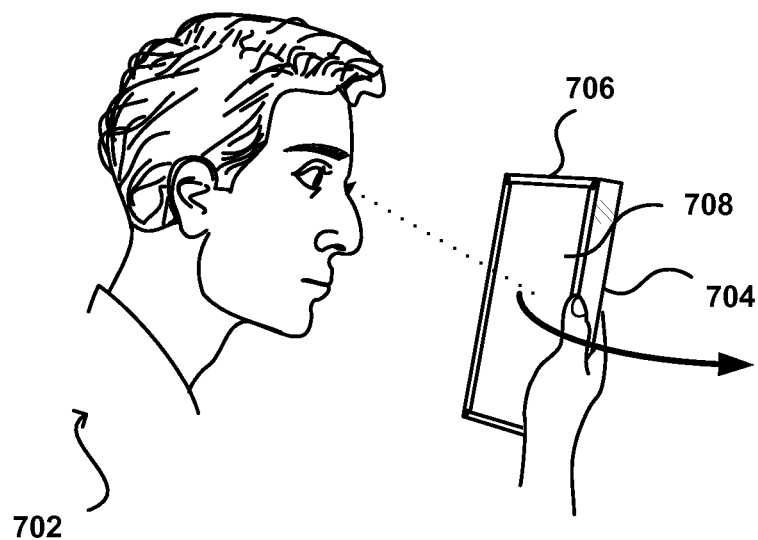

FIG. 7C shows the user 702 viewing the display screen 708 of the computing device 704, e.g., the computing device 104, as described in reference to FIG. 1.

In FIG. 7C, the user 702 has rotated the computing device 704 to the right with respect to the user's 702 perspective. By rotating the computing device 704, image plane that is observable to the camera 706 has changed and, as a result, the position of the user 702 in the image plane has also changed with respect to the movement of the computing device 704. The computing device 704 can capture one or more new images of the user 702 and can use one or more computer vision algorithms, as described above, to detect and track the user 702 in the image plane, as described in reference to FIG. 7D.

Figure 7D:
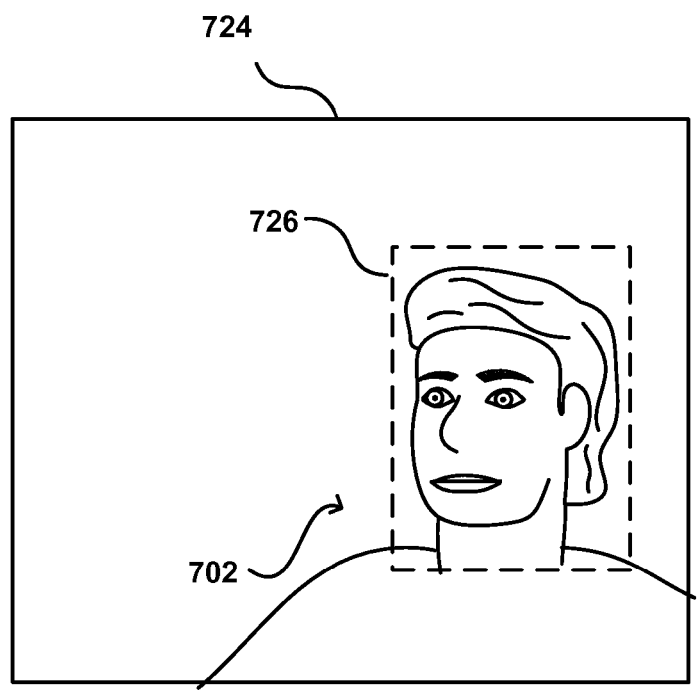

FIG. 7D shows an image 724 of the user 702 that was captured using the camera 706 of the computing device 704 in response to the movement of the computing device 702, as described in reference to FIG. 7C. The user 702 is shown in a different position that has changed with respect to the movement of the computing device 704.

Figure 7E:
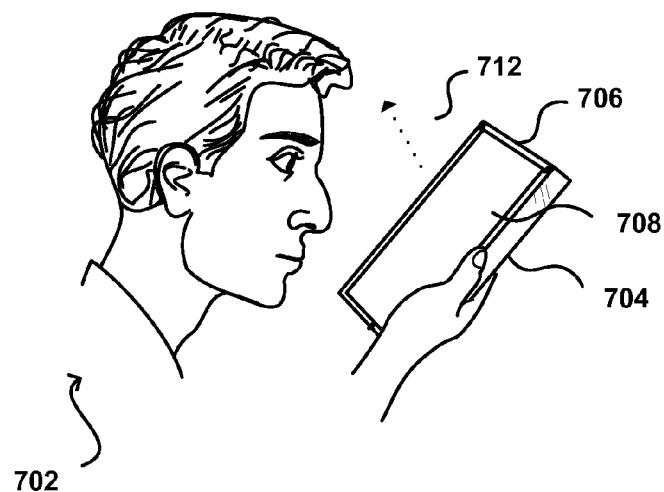

FIG. 7E shows the user 702 viewing the display screen 708 of the computing device 704, e.g., the computing device 104, as described in reference to FIG. 1.

Figure 7F:
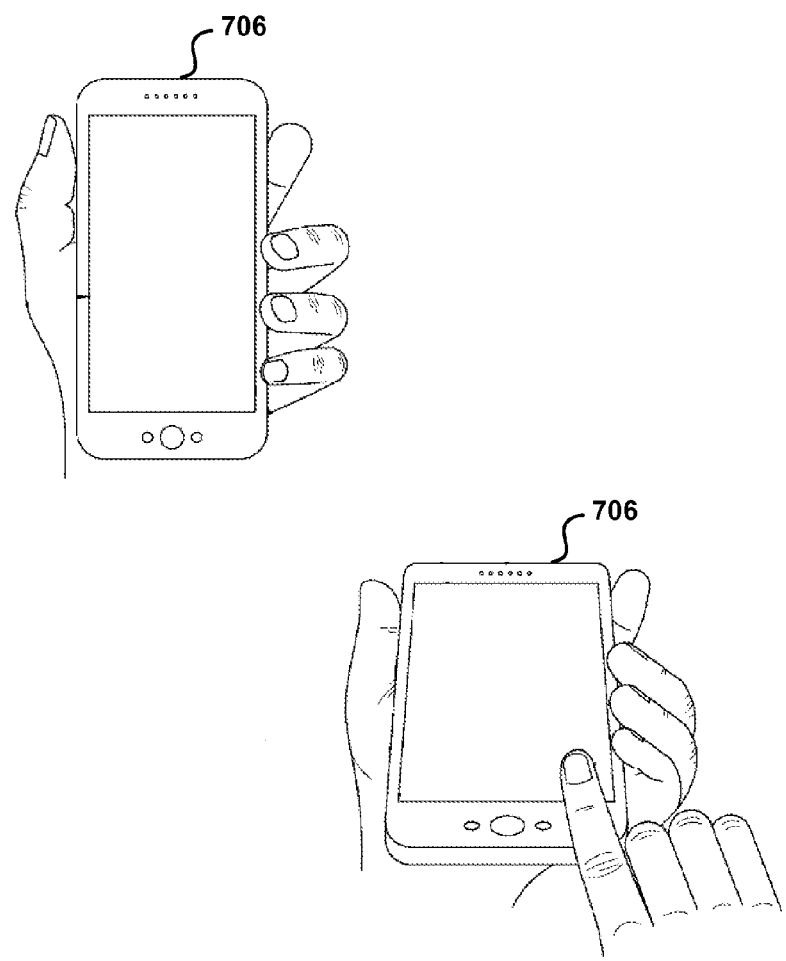

In FIG. 7E-F, the user 702 has tilted the computing device 704 away from the user's face. As a result of the tilting, the image plane that is observable to the camera 706 has changed and, consequently, the position of the user in the image plane will also change with respect to the movement of the computing device 704. In various embodiments, the user can tilt a relative orientation of the device 702 with respect to the user, for example, by a threshold number of degrees, to modify a displayed geographic map, as described above.

For example, the map can be modified by showing different types of information, e.g., displaying traffic information, in the map or the map can be modified by changing certain aspects of the map, e.g., changing the text size of map labels shown in the map, in response to the tilting. Naturally, the computing device 704 can be configured so that tilting the computing device 704 toward the user 702 returns the displayed map to its original state before tilting or modifies the displayed map in a different to show different types of information in the map or to change different aspects of the map.

In some embodiments, tilting the computing device 704, either away from the user or toward the user, can provide a particular functionality while moving the device 704 toward or away from the user provides a different functionality. For example, while in the dynamic view mode, tilting the device 704 may cause scrolling of the map (e.g., north, south, east, west) based on the direction the device 704 is tilted whereas moving the device 704 closer to the user causes the map to be presented in dynamic view mode in which information presented in the normal view mode is replaced by dynamic view information (e.g., replacing labels for certain features with labels for other labels, increasing text sizes of labels, displaying traffic information, etc.).

The computing device 704 can apply computer vision algorithms to the image 724, as described above, to detect and track the user 702 in the image 724. Based on the detection and tracking, the bounding box 726, which identifies a location of the face of the user 702, can be redrawn to update the boundaries of the face. The new location of the user 702 in the image plane can be provided to one or more software applications executing on the computing device 704 to perform various operations, e.g., augmented reality.

Typically, computing devices are configured to rely exclusively on computer vision algorithms to detect and track an object between images that were captured using a camera of the computing device. For reasons described above, this approach can result in an increased consumption of resources, e.g., power, by the computing device.

To regulate this consumption of resources, in some embodiments, sensors in an Inertial Measurement Unit (IMU) are used to track objects in combination with generally known computer vision techniques for object detection and tracking. The use of IMU sensors can be especially appropriate in situations where the object being tracked generally remains stationary with respect to the computing device performing the object detection and tracking.

For example, in such embodiments, once the user 702 in the image plane has been detected by the computing device 704 using one or more computer vision techniques, the computing device 704 can store data describing a position of the user 702 in the image 714, as described in reference to FIG. 7A, together with data describing a position of the computing device 704 in three-dimensional space at the time the image 714 was captured.

The position of the user 702 in the image plane can be determined using computer vision techniques, as described above. Further, the position of the computing device 704 in three-dimensional space can be determined based on data that is obtained from IMU sensors, e.g., gyroscopes and accelerometers. For example, the computing device 704 can determine a position of the computing device 704 by double integrating data that is obtained from an accelerometer in the computing device 704. Additionally, the computing device 704 can determine a rate of change in the computing device's orientation, i.e., angular velocity, using data that is obtained from a gyroscope in the computing device 704. Changes in the angular position of the computing device 704 can be determined, for example, by integrating the measured velocity of the computing device 704.

At the time the image 714 is captured, the computing device 704 can also determine a distance of the user 702 from the camera 707 of the computing device 704. In some embodiments, the distance of the user 702 from the camera 707 of the computing device 704 is determined based on a size of the user 702 as projected in the image plane. For example, most faces have a size that falls within a certain measurement range. Based on this observation, a predefined real world width of face of the user 702 can be predefined. The real world width is a specified width that approximates an actual width of the object that is being identified. For example, a real world width for a human face can be approximated at eight inches in width. The real world width of a soda can be specified as three inches in width. The computing device 704 can determine a projected width of the face of the user 702, as determined by measuring the face of the user 702 in the image 714. The projected width is a width of an object as it appears in an image, for example, in terms of pixels. For example, a human face captured in an image may have a projected width of one hundred pixels. The computing device 704 can then estimate the distance of the face of the user 702 based on a comparison of the real world width and the projected width. This distance can be adjusted based on other factors including, for example, the focal length of the lens of the camera 706.

One example set of equations that can be used to estimate the distance of an object based on a comparison of the real world width and the projected width is reproduced below:

$$PH = f * \left(\frac{AH}{z}\right) \quad \text{(Equation 1)}$$

$$PW = f * \left(\frac{AW}{z}\right) \quad \text{(Equation 2)}$$

where PH is the projected height of the object, where AH is the real world height of the object, where PW is the projected width of the object, where AW is the real world width of the object, where f is the focal length of the camera, and where z is the distance of the object of the object from the camera of the computing device.

In some embodiments, the computing device 704 can determine a distance of the user 702 using multiple cameras of the computing device 704 using techniques for measuring disparity, as described in reference to FIGS. 7A-F, 8A-D, and 9A-H.

In some embodiments, when the computing device 704 is moved from its initial position, as described in reference to FIGS. 7A-B, the computing device 704 can deactivate computer vision-based tracking of the user 702 and switch to determining the user's 702 location using data obtained from the IMU sensors. For example, after the computing device 704 is moved, the computing device 704 can determine an updated position of the computing device 704 in three-dimensional space using the IMU sensors.

The computing device 704 can determine a change in the computing device's position based on a comparison of the updated position of the computing device 704 and the position of the computing device 704 in three-dimensional space at the time the image 714 was captured. Further, based on the change in the computing device's position, the position of the user 702 in the image 714, and the distance of the user 702 from the camera 706 of the computing device 704 at the time the image 714 was captured, the computing device 704 can determine an updated position of the user 702 in three-dimensional space. The computing device 704 can then project the position of the user 702 from three-dimensional space to a two-dimensional image plane determine the user's 702 updated location.

In some embodiments, the computing device 704 is configured to verify that the updated location of the user in the image plane, as determined using IMU sensors, is accurate. In such embodiments, the computing device 704 can determine a location of user 702 using image-based object locating techniques, as described above, and comparing that location with the location of the user 702 that was determined using the IMU sensors. In some embodiments, the computing device 704 switches back to using image-based locating techniques to track the user 702 if the distance between the location determined using image-based object tracking techniques and the location determined using IMU sensors satisfies a specified threshold.

In some embodiments the computing device 704 can be configured to alternate between image-based object locating techniques and IMU sensor-based object locating techniques. For example, the computing device 704 can be configured to determine the user's position using IMU sensors at a first time interval, e.g., every 100 milliseconds, and to determine the user's position using image-based object tracking at a second time interval, e.g., every 1 second. The first time interval can occur more frequently to allow less consumption of power by the computing device 704. The determined locations of the user 702 using the IMU sensors and the image-based object locating techniques can be compared at certain time intervals, e.g., every time image-based object tracking is used, to ensure that the locations determined by the IMU sensors are accurate. The first and second time intervals can be adjusted based on the accuracy of the IMU sensors. For example, if the locations determined using the IMU sensors are inaccurate, then the computing device 704 can perform image-based object locating more often. In contrast, if the IMU sensors are accurate, or mostly accurate, then the computing device 704 can perform image-based object locating less often and IMU sensor-based object locating more often.

In some instances, the use of IMU sensors to determine the user's location may not be feasible due to the circumstances surrounding the movement of the computing device 704. For example, if the user 702 is in a moving vehicle, e.g., a train, or a swiveling chair, the use of IMU sensors may result in erroneous tracking predictions. The computing device 704 can be configured to identify such situations and, in response, rely on image-based object locating techniques to track the user 702 until the situation has subsided. In some embodiments, the computing device 704 identifies such situations by evaluating of the image backgrounds of images that were captured by the camera 707 of the computing device 704. In instances where there are significant disparities in the image backgrounds, the computing device 704 switch to relying on image-based object locating techniques to track the user 702. For example, a significant disparity can arise when the background in a first image contains trees and the background in a second image contains mountains and no trees.

The techniques described in this specification can be used to detect and track other types of objects besides humans. For example, the computing device 704 can be configured to detect and track a book. When tracking a book, the computing device 704 can determine, or obtain from a database, a real world size of the book being tracked, and then determine based on the real world size of the book and a projected size of the book, the distance of the book from the camera 706 of the computing device 704. This data can be used to track the book using IMU sensors, as described above. The computing device 704 can use IMU sensors in combination with computer vision techniques in, for example, augmented reality applications without having to rely solely on computationally and power intensive computer vision algorithms.

Figure 8A:
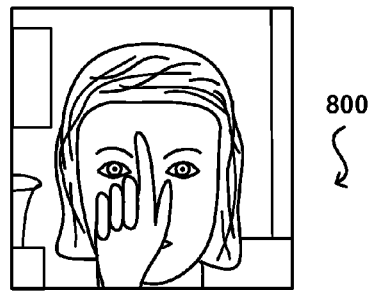
FIGS. 8A-D illustrate applying stereoscopic image data in accordance with various embodiments.
Figure 8B:
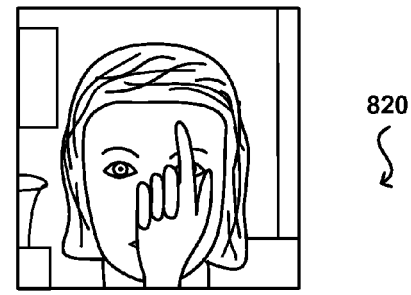

In some embodiments, three-dimensional or stereoscopic image information can be captured using multiple cameras to provide three-dimensional point data, or disparity information, that can be used to detect and track objects. For example, FIGS. 8A-D illustrate applying stereoscopic image data in accordance with various embodiments. For example, FIGS. 8A and 8B illustrate images 800 and 820 that can be captured using a pair of cameras, e.g., stereoscopic cameras that are in a computing device, e.g., the computing device 104. In various embodiments, a pair of cameras may capture images simultaneously or in close proximity to one another. As a result, the captured images would include at least some matching points of interest. For example, a user's finger, nose, eyes, eyebrows, lips, or other features may be detected or tracked by the computing device in both images by using the various techniques discussed elsewhere herein.

Figure 8C:

FIG. 8C illustrates an example combination image 840 showing the relative position of various objects in the captured images 800 and 820 if those images were "overlaid" or "superimposed." This illustrates the amount of disparity, or lateral offset, between objects in the captured images. Objects in the images that are closer to the device, e.g., the finger, have relatively large amounts of disparity. Objects in the images that are further away from the device, e.g., the painting on the wall, have relatively small amounts of disparity. Objects in the images that are between these two areas will have intermediate amounts of disparity based upon the relative distance of those objects from the cameras.

Figure 8D:
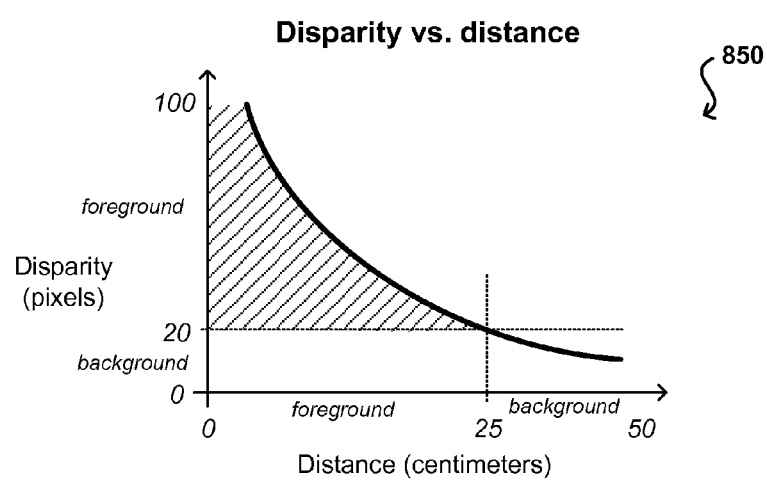

FIG. 8D illustrates an example plot 850 showing a relationship of disparity with respect to distance. As illustrated, the amount of disparity is inversely proportional to the distance from the cameras, such that there can be significantly more disparity in the near camera field, e.g., 0 to 1.0 m, than in the far field, e.g., 1.0 m to infinity. Further, the decrease is not linear. However, objects decrease more quickly near the device than at a distance, as objects in the distance can have little to no disparity regardless of whether they are twenty feet away or a mile away. An approach in accordance with various embodiments can determine the distance between an object or feature and the device based on the amount of stereo disparity for the object between two images captured by the pair of cameras. For example, a user's face looking at a smart phone might typically be located within 50 centimeters from the device. By examining the disparity relationship curve 850 or relationship, the computing device, or an application or user of the device, can determine that the amount of disparity at fifty centimeters for the configuration parameters of the current device, e.g., camera resolution, camera separation, or field of view is twenty five pixels of separation between images. Using this information, the device can analyze matching feature points, e.g., nose, eyes, or fingertips, in the stereo images, and determine the approximate distance between those feature points and the computing device. For example, the amount of disparity, D, at a given distance, z, can be represented by the relationship.

$$D = f * B / z \quad \text{(Equation 3)}$$

where f is the focal length of each of the matched cameras and B is the baseline, or distance between the viewpoints of the cameras based at least in part upon their relative positions and separation. In this example, if the focal length of a camera is four hundred pixels and the baseline is five centimeters, for a distance of one meter the disparity would be twenty pixels. Based on relationships such as this one, the computing device may be able to determine the distance between the object of interest and the device. Various other approaches can be utilized as well as should be apparent to one of ordinary skill in the art in light of the teachings and suggestions contained herein. For example, other approaches for determining a distance between an object of interest and the device can include using time-of-flight cameras or structured light cameras. A time-of-flight camera is a range imaging camera system that determines a distance of an object from the camera based on the known speed of light. For example, the camera can measure the time-of-flight of a light signal between the camera and the object for each point of an image of the object. A structured light camera is a three-dimensional scanning device used for measuring the three-dimensional shape of an object using projected light patterns and a camera.

Figure 9A:
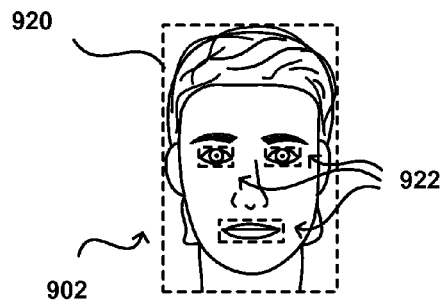
FIGS. 9A-H illustrate examples of tracking a user in accordance various embodiments.

FIGS. 9A-F illustrate approaches for detecting and tracking a user in accordance with various embodiments. FIG. 9A illustrates an example wherein the approximate position and orientation of the head of a user 902 has been determined and a virtual "box" 920 is placed around the user's head using one or more of the various user detection processes discussed herein. A similar or different approach can also be used to determine an approximate location and area 922 of each of the user's face, eyes, mouth, or other facial features. Further, the relative movement of the user's eyes and mouth can be easier to detect than the overall movement of the user's face when the user is performing motions such as nodding or shaking the head back and forth.

Figure 9B:
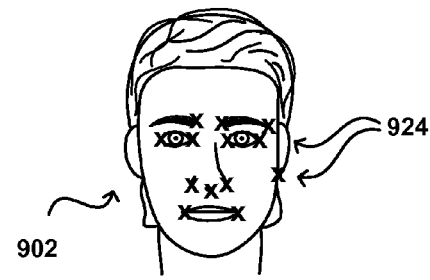

Various other approaches can also be used to detect and track the user. For example, FIG. 9B illustrates an example wherein various features on a user's face are identified and assigned a point 924 in the image. The system thus can detect various aspects of user facial features and can determine changes such as movement or change in shape or expression. Such an approach can provide advantages over the general approach of FIG. 9A in certain situations, as various points along a facial feature can be determined, such as the end points and at least one center point of a user's mouth. Accordingly, expressions such as a smile or frown can be captured even though the overall position of the user's mouth or face did not move. Once the facial features of a user are detected, relative motion or changes in facial expression can be tracked and utilized as input in accordance with various embodiments.

Figure 9C:
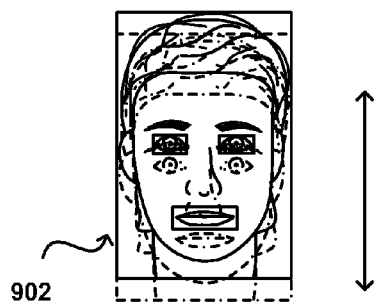

For example, FIG. 9C illustrates an example where the user's head 902 is moving up and down with respect to the field of view of the imaging element. For example, this could be the result of the user shaking his or her head, or the user moving the device up and down.

Figure 9D:
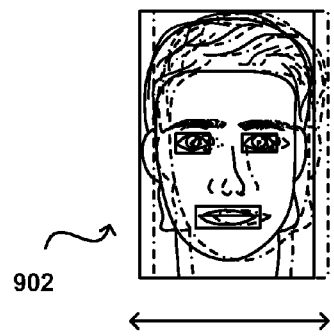

FIG. 9D illustrates a similar example where the user is moving right to left relative to the device, through movement of the user, the device, or both. As can be seen, each movement can be tracked as a vertical or horizontal movement, respectively, and each can be treated differently as an input to perform a specified function. As should be understood, various embodiments also can detect diagonal or other such movements.

Figure 9E:
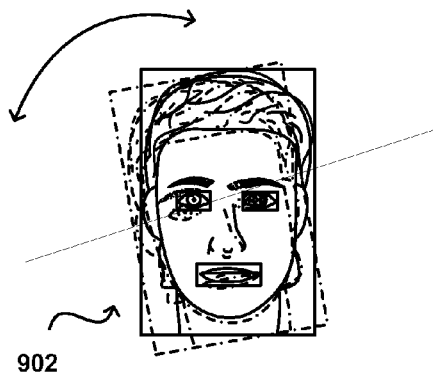

FIG. 9E further illustrates an example wherein the user tilts the device or the user's head, and the relative change in eye position is detected as a rotation. In some systems, a "line" that corresponds to the relative position of the eyes (or other facial features such as eyebrows, hairline, mouth, chin, ears, etc.) can be monitored, and a shift in angle of this line can be compared to an angle threshold to determine when the rotation should be interpreted as input.

Figure 9F:

FIG. 9F illustrates another advantage of using an approach to determine the position of various features on a user's face. In this example, it can be seen that the features of a head of a second user 904 have a different relative position and separation. Thus, a computing device also can not only determine positions and changes of facial features for a specific user, but can distinguish between different users. Also, the device can be configured to detect how close a user is to the device based on, for example, the amount and ratio of separation of various features, such that the device can detect movement towards, and away from, the device. This can help to improve the accuracy of facial tracking.

Figure 9G:
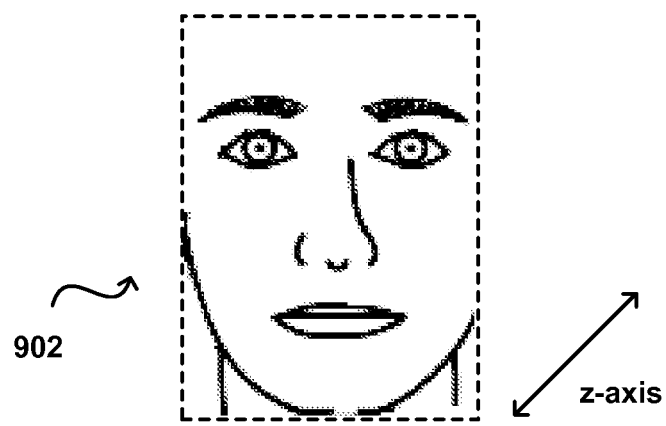

For example, FIG. 9G illustrates an example where the distance between the user's head 902 and the computing device has been reduced. For example, this could be the result of the user bringing the user's head 920 closer to a display screen of the computing device along the z-axis.

Figure 9H:
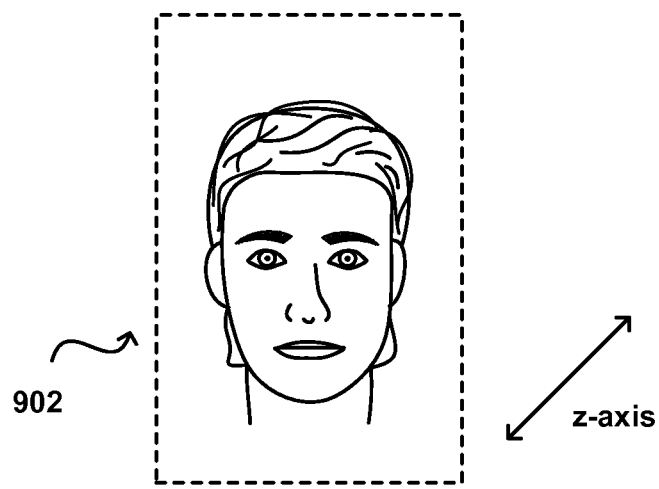

For example, FIG. 9H illustrates an example where the distance between the user's head 902 and the computing device has been increased. For example, this could be the result of the user moving the user's head 920 further away from the display screen of the computing device.

Figure 10:
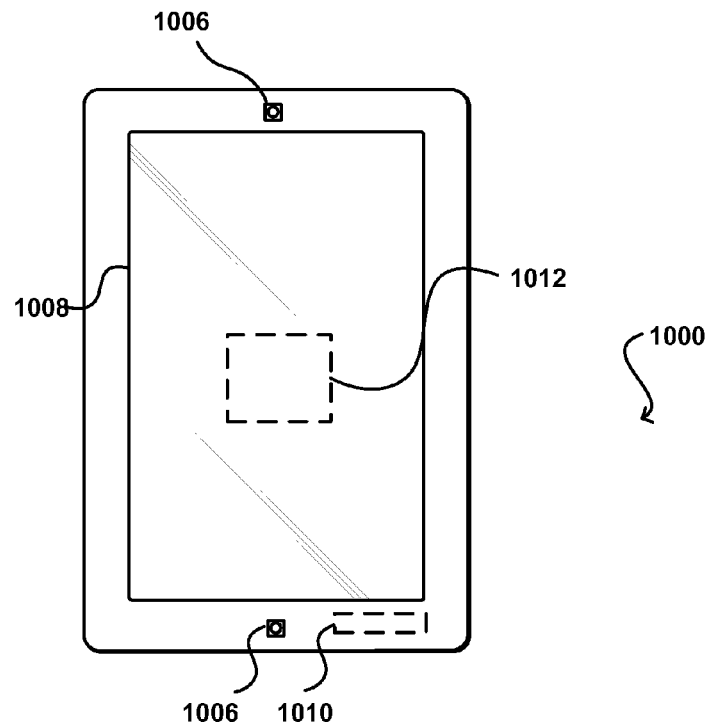
FIG. 10 illustrates an example computing device.

FIG. 10 illustrates an example computing device 1000 that can be used to perform approaches described in accordance with various embodiments. In this example, the device includes two image capturing components 1006 located at the top and bottom of a front face of the device and on the same surface as the display element 1008, and enabling the device to capture images in accordance with various embodiments, such as images of a user viewing the display element and/or operating the device. The computing device includes audio input element 1010, such as a microphone, to receive audio input from a user. In some embodiments, the audio data can be used in conjunction with other approaches to estimate the pose of the user. The computing device also includes an inertial measurement unit (IMU) 1012, including a three-axis gyroscope, three-axis accelerometer, and magnetometer, that can be used to detect the motion of the device, from which position and/or orientation information can be derived.

Figure 11:
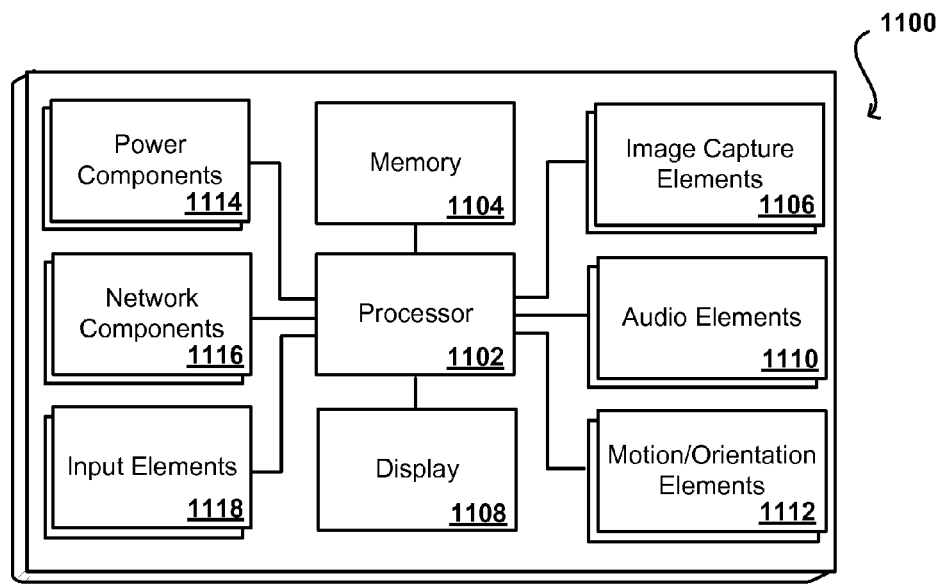
FIG. 11 illustrates an example configuration of components of a computing device.

FIG. 11 illustrates a logical arrangement of a set of general components of an example computing device 1100. In this example, the device includes a processor 1102 for executing instructions that can be stored in a memory device or element 1104. As would be apparent to one of ordinary skill in the art, the device can include many types of memory, data storage, or non-transitory computer-readable storage media, such as a first data storage for program instructions for execution by the processor 1102, a separate storage for images or data, a removable memory for sharing information with other devices, etc. The device typically will include some type of display element 1106, such as a touch screen or liquid crystal display (LCD), although devices such as portable media players might convey information via other means, such as through audio speakers. As discussed, the device in many embodiments will include at least one image capture element 1108 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 1112, such as a mono or stereo microphone or microphone array, operable to capture audio information from at least one primary direction. A microphone can be a uni- or omni-directional microphone as known for such devices.

In some embodiments, the computing device 1100 of FIG. 11 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 1100 also can include at least one orientation or motion sensor 1110. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as elements that enable location determinations through triangulation or another such approach. These mechanisms can communicate with the processor 1102, whereby the device can perform any of a number of actions described or suggested herein.

As an example, a computing device can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device comprising:
one or more processors;
a display screen; and
memory storing instructions that, when executed by the one or more processors, cause the computing device to perform operations, comprising:
receiving map data associated with a geographic region, the map data including a first map label for a first point of interest that is located in the geographic region and a second map label for a second point of interest that is located in the geographic region;
displaying a visual representation of the geographical region at a first level of detail using a set of pixels of the display screen, the first level of detail associated with a first number of points of interest that includes the first point of interest and that excludes the second point of interest;
detecting a double-tap on a back side of the computing device opposing the display screen;
initiating a dynamic view mode associated with controlling a level of detail of the visual representation of the geographic region using one or more gestures;
determining that a distance between a user and the display screen has decreased beyond a threshold distance;
determining that the distance decreasing beyond the threshold distance corresponds to a first gesture associated with adjusting the level of detail from the first level of detail to a second level of detail; and
displaying the visual representation at the second level of detail using the set of pixels, the second level of detail associated with a second number of points of interest that is greater than the first number of points of interest and that includes the first point of interest and the second point of interest.

2. The computing device of claim 1, wherein the instructions when executed further cause the computing device to perform additional operations, comprising:
receiving user context information that includes a category of points of interest at which the user is located;
determining the second number of points of interest based at least in part on the user context information; and
omitting at least one map label associated with the category from the visual representation at the second level of detail.

3. The computing device of claim 2, wherein the instructions when executed further cause the computing device to perform second additional operations, comprising:
determining that the category is hotels; and
omitting one or more map labels for hotels from the visual representation of the geographic region at the second level of detail.

4. The computing device of claim 1, wherein the instructions when executed further cause the computing device to perform additional the computing device to perform additional operations, comprising:
detecting a second double-tap on the back side of the computing device;
exiting the dynamic view mode; and
displaying the visual representation of the geographic region at the first level of detail using the set of pixels.

5. A computer-implemented method comprising:
displaying, using a set of pixels of a display screen, a visual representation of a geographic region at a first level of detail, the first level of detail associated with a first number of points of interest that includes a first point of interest that is located in the geographic region and that excludes a second point of interest that is located in the geographic region;
receiving an input to initiate a mode associated with controlling a level of detail of the visual representation of the geographic region using one or more gestures;
detecting a first gesture associated with adjusting the level of detail from the first level of detail to a second level of detail; and
displaying, using the set of pixels, the visual representation of the geographic region at the second level of detail, the second level of detail associated with a second number of points of interest that is different from the first number of point of interests and that includes the second point of interest.

6. The computer-implemented method of claim 5, further comprising:
receiving a second input to exit the mode; and
displaying, using the set of pixels, the visual representation of the geographic region at the first level of detail.

7. The computer-implemented method of claim 5, further comprising:
displaying a three-dimensional graphical model of at least one building located in the geographic region at one level of detail; and
displaying a two-dimensional graphical model of the at least one building at another level of detail.

8. The computer-implemented method of claim 5, further comprising:
displaying at least one map label at a first text size at one level of detail; and
displaying the at least one map label at a second text size at another level of detail.

9. The computer-implemented method of claim 5, further comprising:
disabling a capability to display the geographic region at different scales during operation of the mode.

10. The computer-implemented method of claim 5, further comprising:
detecting a double-tap on a side opposing the display screen as the input to initiate the mode.

11. The computer-implemented method of claim 5, further comprising:
determining that a change in distance between an object and the display screen satisfies a threshold distance as the first gesture.

12. The computer-implemented method of claim 5, further comprising:
determining the second number of points of interest based at least in part on user context information.

13. The computer-implemented method of claim 12, wherein the user context information includes a category of points of interest at which a user is located, and wherein the method further comprises:

omitting at least one map label associated with the category at the second level of detail.

14. A non-transitory computer readable storage medium storing instructions that, when executed by one or more processors, cause the one or more processors to:
- display, using a set of pixels of a display screen, a visual representation of a geographic region at a first level of detail, the first level of detail associated with a first number of points of interest that includes a first point of interest that is located in the geographic region and that excludes a second point of interest that is located in the geographic region;
- receive an input to initiate a mode associated with controlling a level of detail of the visual representation of the geographic region using one or more gestures;
- detect a first gesture associated with adjusting the level of detail from the first level of detail to a second level of detail; and
- display, using the set of pixels, the visual representation of the geographic region at the second level of detail, the second level of detail associated with a second number of points of interest that is different from the first number of points of interest and that includes the second point of interest.

15. The non-transitory computer readable storage medium of claim 14, wherein the instructions when executed further cause the one or more processors to:
- omit a map label for the second point of interest from the visual representation of the geographic region at the first level of detail; and
- display the map label in the visual representation of the geographic region at the second level of detail.

16. The non-transitory computer readable storage medium of claim 14, wherein the instructions when executed further cause the one or more processors to:
- display traffic data for at least one road that is at least partially located in the geographic region at one level of detail; and
- omit the traffic data for the at least one road at another level of detail.

17. The non-transitory computer readable storage medium of claim 14, wherein the instructions when executed further cause the one or more processors to:
- detect a second gesture associated with adjusting the level of detail from the second level of detail to a third level of detail, the second gesture being a selection of a category of points of interest; and
- display, using the set of pixels, the visual representation of the geographic region at the third level of detail, the third level of detail associated with a third number of points of interest that includes one or more points of interest associated with the category.

18. The non-transitory computer readable storage medium of claim 14, wherein the instructions when executed further cause the processor to:
- detect a double-tap on a side opposing the display screen as the input to initiate the mode; and
- determine that a change in distance between an object and the display screen satisfies a threshold distance as the first gesture.

19. The non-transitory computer readable storage medium of claim 14, wherein the instructions when executed further cause the processor to:
- display at least one map label at a first text size at one level of detail; and
- display the at least one map label at a second text size at another level of detail.

20. The non-transitory computer readable storage medium of claim 14, wherein the instructions when executed further cause the one or more processors to:
- disable a capability to display the geographic region at different scales during operation of the mode.

* * * * *